United States Patent [19]

O'Brien

[11] Patent Number: 4,619,763
[45] Date of Patent: Oct. 28, 1986

[54] OZONE H₂O TREATMENT

[76] Inventor: Edward J. O'Brien, 251-5th Street NW., New Brighton, Minn. 55112

[21] Appl. No.: 663,594

[22] Filed: Oct. 22, 1984

Related U.S. Application Data

[63] Continuation-in-part of Ser. No. 515,594, Jul. 21, 1983, abandoned.

[51] Int. Cl.⁴ ............................ C02F 1/78; B01J 19/08
[52] U.S. Cl. ..................................... 210/177; 210/192; 422/186.19
[58] Field of Search ............ 210/760, 243, 192, 221.2, 210/177, 180, 181, 194, 257.1; 422/186.2, 186.11, 186.18, 186.19

[56] References Cited

U.S. PATENT DOCUMENTS

| | | | |
|---|---|---|---|
| 2,405,553 | 8/1946 | Allison | 422/186.2 X |
| 3,748,262 | 7/1973 | Lee et al. | 210/192 X |
| 3,856,671 | 12/1974 | Lee et al. | 210/192 X |
| 4,049,552 | 9/1977 | Arff | 210/192 |
| 4,090,960 | 5/1978 | Cooper | 210/760 X |
| 4,116,790 | 9/1978 | Prestridge | 210/243 X |
| 4,256,574 | 3/1981 | Bhorgava | 210/760 X |

Primary Examiner—Tom Wyse
Attorney, Agent, or Firm—Orrin M. Haugen; Thomas J. Nikolai; Frederick W. Niebuhr

[57] ABSTRACT

A water purification system which includes a source of water under pressure, a source of ozone, and means for continuously injecting measured quantities of ozone into the water being purified. The injector means is preferably a venturi which is interposed along the water supply line, and the ozone source is an ozone generator which is disposed in close proximity to the venturi injector. In order to reduce the decomposition of ozone between the generator and the injector site, cooling means are provided for maintaining the ozone at a temperature preferably below about 60° F.

5 Claims, 5 Drawing Figures

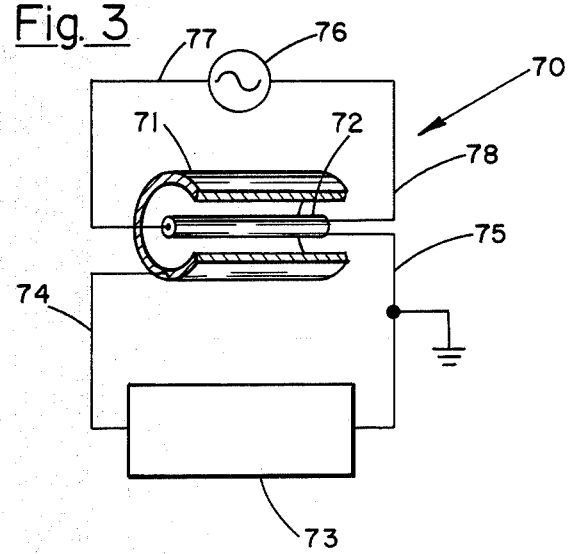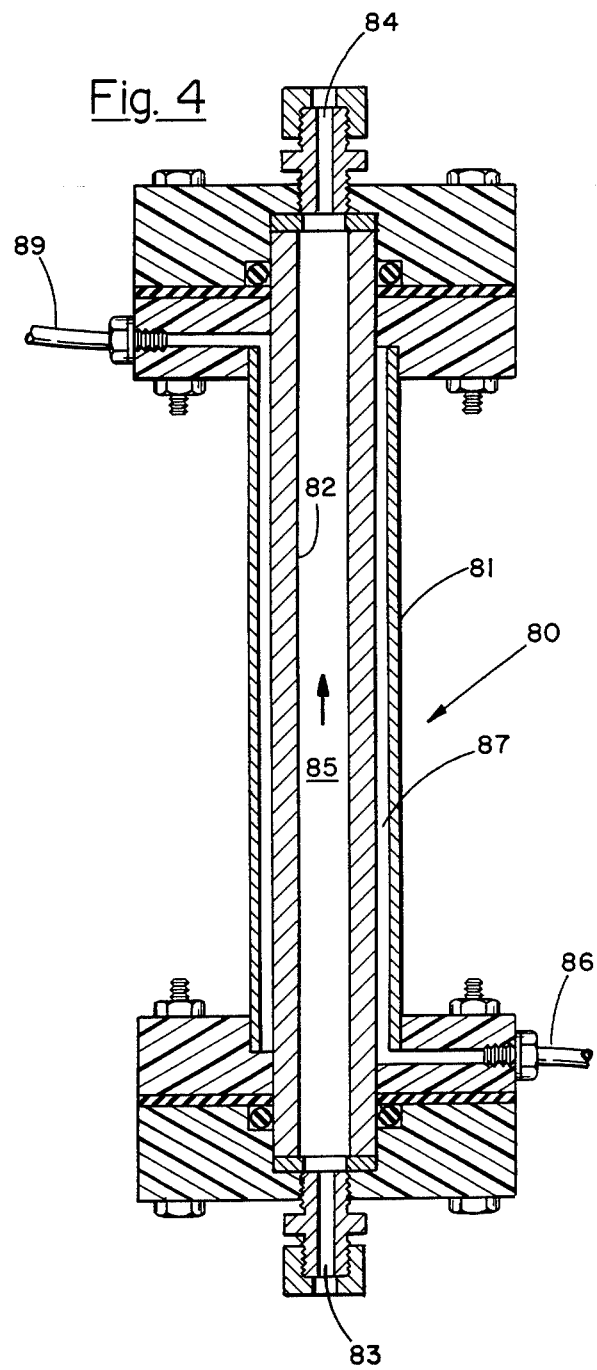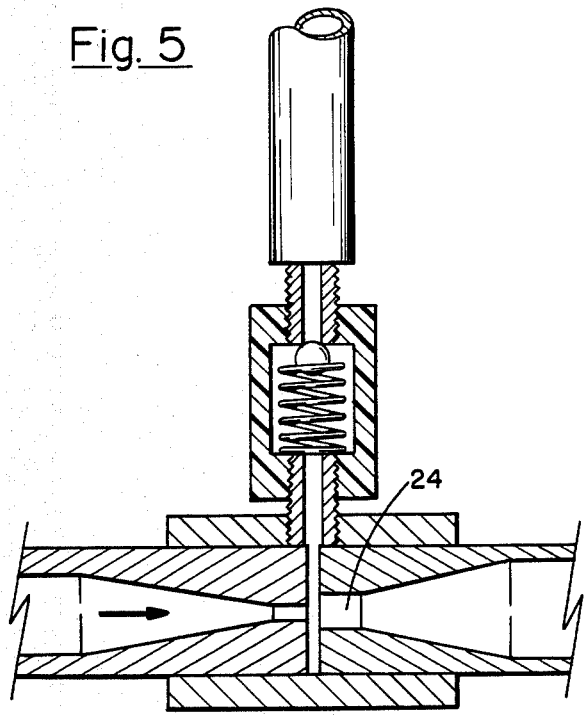

OZONE H₂O TREATMENT

CROSS-REFERENCE TO RELATED APPLICATION

The present application is a continuation-in-part of my copending application Ser. No. 515,594, filed July 21, 1983, entitled "OZONE H₂O TREATMENT" abandoned.

BACKGROUND OF THE INVENTION

The present invention relates generally to a water purification system, and more specifically to a system for generating potable water from sources which may be contaminated with impurities susceptible of being converted to a non-toxic state through treatment with ozone. The water purification system employs an ozone generator which is capable of generating approximately 2% of ozone in an atmosphere of either air or 3% of oxygen, and with the system being designed to continuously inject the ozone-enriched atmosphere into the water through a venturi injection system. The water purification system of the present invention is self-contained, and may be efficiently packaged in a relatively modest volume.

As standards of living improve, the stress effects upon the environment, including sources of water, become more severe and more drastic. In other words, the quality of normally available ground water, surface water, and other normal sources of drinking water is inversely proportional to the standard of living of persons adjacent these sources. Also, as societies become more affluent, that society tends to create more undesirable effluents. While these effluents may be discharged both into the air as well as into the soil, the undesirable constituents of these effluents will frequently find their way into the normal water supply. Such water supplies include, traditionally, wells which tap the ground water, as well as systems for taking surface water from lakes, rivers, ponds, and the like. Surface water normally requires purification before introduction for distribution into supplies of potable water, while ground water supplies have traditionally been regarded as safe, although instances of contaminated ground water appear to increase as society becomes more mechanized and complex and as disposal of hazardous waste materials becomes more common.

In instances where there is a danger of obtaining contaminated water in a conventional water supply, self-contained purification systems are often utilized. One recognized material for purifying certain contaminated waters is ozone, with ozone having been found to have a profound effect upon microbiological organisms as well as having an effect upon organic materials which, when oxidized, become harmless to humans for consumption. Generally, however, ozone concentrations in excess of about 2 parts per million is required to destroy microbiological life, with the rate of destruction increasing with higher concentrations of ozone. Similar effects are observed with organic contaminants. Also, in order to increase the efficacy of the exposure to ozone, and in accordance with the present invention, a re-circulating feature has been introduced into the system.

SUMMARY OF THE INVENTION

In the present invention, a self-contained water purification system utilizing freshly generated ozone is utilized. Means are provided to controllably inject measured quantities of the ozone-enriched atmosphere such as oxygen or air into the water supply, and means are provided for preserving the quality of the ozone-ladened atmosphere so that the ozone concentration does not drop below desired and effective levels. Simplified means are provided for achieving such preservation of the ozone, with the incoming water supply being one source of cooling for the ozone-enriched atmosphere as it passes from the ozone generator to the injection site, and with means being provided for re-circulation through the ozone contacting zone for the water being treated.

Briefly, in accordance with the present invention, a water purification system is provided which includes a source of water under pressure, along with an ozone generator. The ozone generator enriches the concentration of ozone in the atmosphere to be passed through the incoming water to a level of between about 1% and 3%, with the ozone-enriched atmosphere being chilled as it passes from the ozone generator to the injection site. Also, in order to further preserve the quality of the ozone, dry air or dry oxygen is employed for passage through the ozone generator, with the dry gas having a dewpoint preferably in the range of below about minus 60° F. For consistent injection of ozone-enriched atmosphere into the water supply, a venturi injector is employed which provides a constant and consistent source of an ozone-enriched atmosphere for the water passing therethrough. Furthermore, means are provided for re-circulating water from a reservoir or holding tank for at least partial repeated passages through the venturi injector to achieve repeated exposure of the water to ozone.

Therefore, it is a primary object of the present invention to provide an improved water purification system wherein water to be purified is contacted with ozone in controllable quantities, and wherein the ozone-enriched atmosphere is maintained at a depressed temperature level prior to contact with the water being treated so as to preserve the concentration of ozone therein, and where means are provided for repeated contact of the water with ozone.

It is a further object of the present invention to provide an improved water purification system wherein water to be purified is contacted with a controlled flow of an ozone-enriched atmosphere such as oxygen or air, and wherein the ozone-enriched atmosphere is caused to flow from an ozone generator substantially immediately and directly into an injector for direct delivery to the water supply.

Other and further objects of the present invention will become apparent to those skilled in the art upon a study of the following specification, appended claims, and accompanying drawings.

IN THE DRAWINGS

FIG. 3 is an isometric and schematic view of a typical ozone generator capable of use in connection with the water purification system of the present invention, and illustrating schematically means for creating a corona discharge in a water-cooled structure;

FIG. 4 is a sectional view taken generally through the diameter of a cylindrical ozone generating chamber of the type shown schematically in FIG. 3; and FIG. 5 is a sectional view taken generally through the diameter of the venturi injector system utilized for introducing ozone-enriched atmosphere into the water supply of the water purification system of the present invention.

DESCRIPTION OF THE PREFERRED EMBODIMENT

Figure 1:
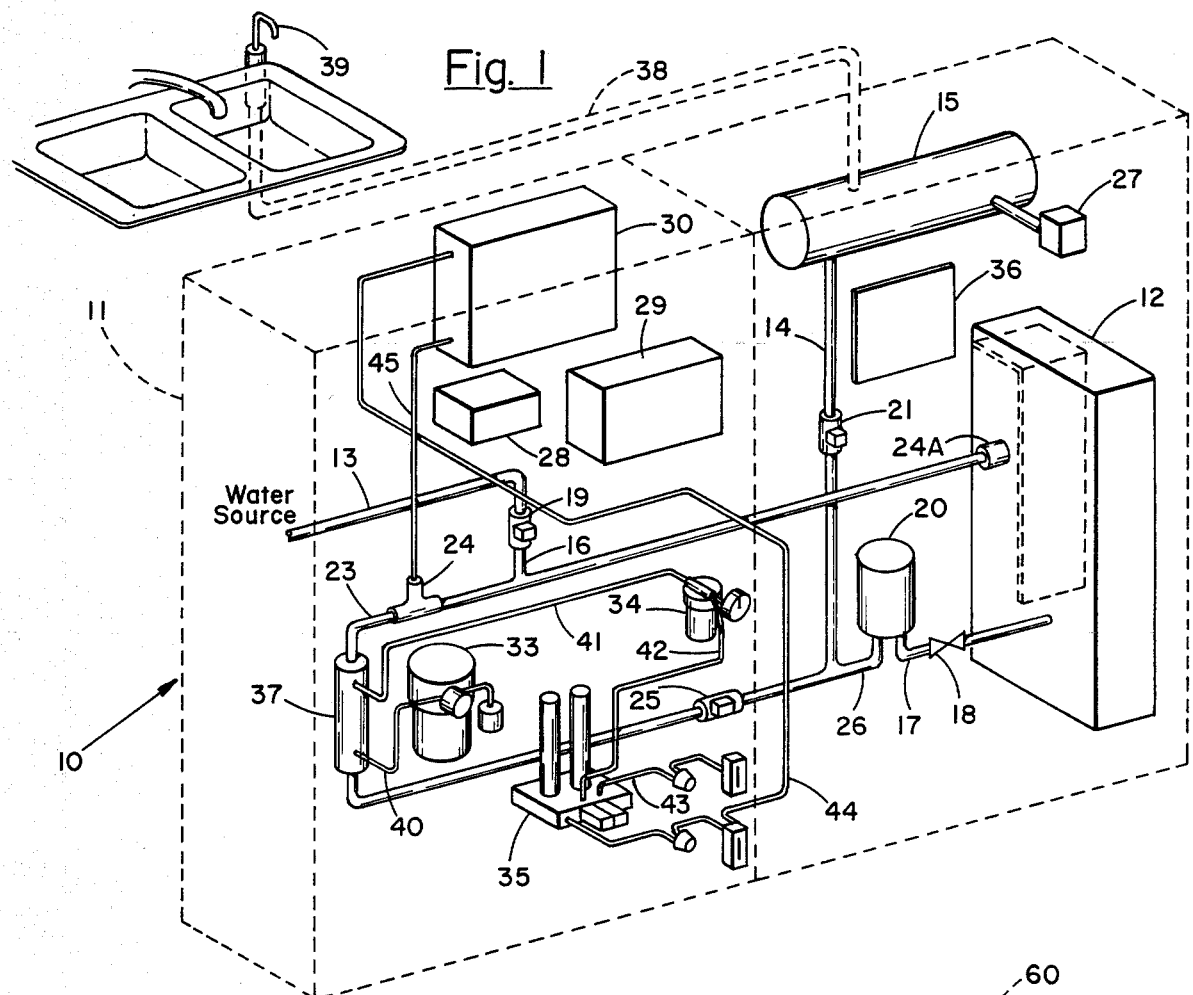
FIG. 1 is a schematic diagram illustrating the preferred embodiment of the water purification system of the present invention.

In accordance with the preferred modification of the present invention, and with particular attention being directed to FIG. 1 of the drawings, the water purification system generally designated 10 includes an enclosure, illustrated in phantom, as at 11, which encloses and provides a shroud for the components of the system. The components include a reaction and cycle tank 12, which is supplied with water through a source conduit as at 13, and a discharge line as at 14 coupled to hydropneumatic pressure tank 15. The water source, which may in certain instances be contaminated, supplies water to "tee" 16, which connects to a branch line 26 which is provided for recycling. The water from the pressurized source line 13 flows through line 23, which causes the water to pass through the venturi injector 24 which injects an ozone-enriched atmosphere. The ozonated water continues to flow through line 23 into the reaction/cycle tank 12 and fills this tank 12 until an internal level control indicates that the maximum level is reached in the reaction tank and then the solenoid valve 19 is automatically shut off by the control 36. When the pressure drops in the hydropneumatic tank 15, the pressure-actuated switch 27 energizes the pump 20 and opens the solenoid valve 21 allowing water to be supplied to the hydropneumatic tank through line 14. When the pressure is again built up in the hydropneumatic tank 15, the pressure switch 27 sends a signal to the control 36 and the cycle pump 20 and control solenoid valve 21 shut down. When the water level in the reaction/cycle tank 12 reaches a low level, an interior sensor indicates this low level to the control which will then open the inlet solenoid valve 19 and activate the ozone system and therefore allow for the refilling of the cycle tank 12 with ozonated water. Such pressure control hydropneumatic tanks are, of course, commercially available, however, the unique feature is in the automatic control to the system provided by the specially designed solid state control 36. The system, as illustrated in FIG. 1, has an additional feature which allows for the recirculation of the water in the reaction/cycle tank 12 when there is no demand. This produces additional ozonated and enriched water which other systems do not provide for. On a signal from the control 36, which is activated by an internal timer, the cycle pump 20 draws the water from the reaction/cycle tank 12 and passes it through line 26 when the control 36 opens the solenoid valve 25. The water then passes through the venturi injector 24 wherein the ozone content of the water is enriched. As indicated above, the re-circulation feature permits water to be passed through the venturi injector 24 on a continuous or substantially continuous basis, thereby providing for increased exposure of the water to ozone. The ozone enriched water leaves the venturi, mixes with the raw water during the fill cycle, hence into the in-line reactor 24A and into the reactor/clarifier tank 12.

The strong intimate contact between water flowing within venturi injector 24 and the ozone enriched atmosphere permit the occurrence of first-order reactions contributing to the purification of the water. Following the occurrence of the first-order reactions, the water, after passing through the contactor zone, mixes with raw water from the water source. When this mixing occurs, second order reactions take place, and as the water then proceeds toward and into the reactor/clarifier, third-order reactions occur. When there is no demand on the water output of the system, the water from the tank 12 is re-cycled, and the first, second, and third-order reactions continue for each successive cycling and/or re-cycling event.

Turning now to the ozone generator portion of the system, air is provided to the system 10 by the air compressor 33, which causes the air to flow through line 40 into the chiller 37. The chiller is unique in design and provides an adequate means to cool the air to a relatively low temperature, preferably below 60° F. without the use of a refrigerant. The cooled air then flows through line 41 into the condensate bulb 34 which removes the heavier particles of moisture. The condensate bulb is equipped with an air pressure gauge to indicate the pressure of the air in the ozone generator portion of the system. The air then flows through line 42 into the air drier 35 which is a unique twin tower design with single solenoid control for constant use without removal of the interior drying agent. While one tower of the drier 35 is used to dry the air provided to the electrode 30, the second tower is reactivated to dry by passing air through it and out line 43 through a pressure regulator and flow indicator to the atmosphere. The air required to ozonate the water is supplied to the electrode 30 through line 44. The air flows into the electrode 30 and is passed through an electrical charge produced by the high voltage system 28 and the generator 29. The oxygen in the dry air is converted into ozone and then passes out of the electrode into line 45 and into the venturi injector 24 and into the water. When oxygen is utilized, this gas will be introduced through a pressure reduction valve, and otherwise treated as indicated herein. A control panel 36, which is of a solid state design, controls all of the equipment of the ozone generating system automatically. In a typical installation, as illustrated in FIG. 1, ozone-treated water is delivered along conduit 38 from the hydropneumatic tank 15 to a discharge outlet as at spigot 39.

Figure 2:
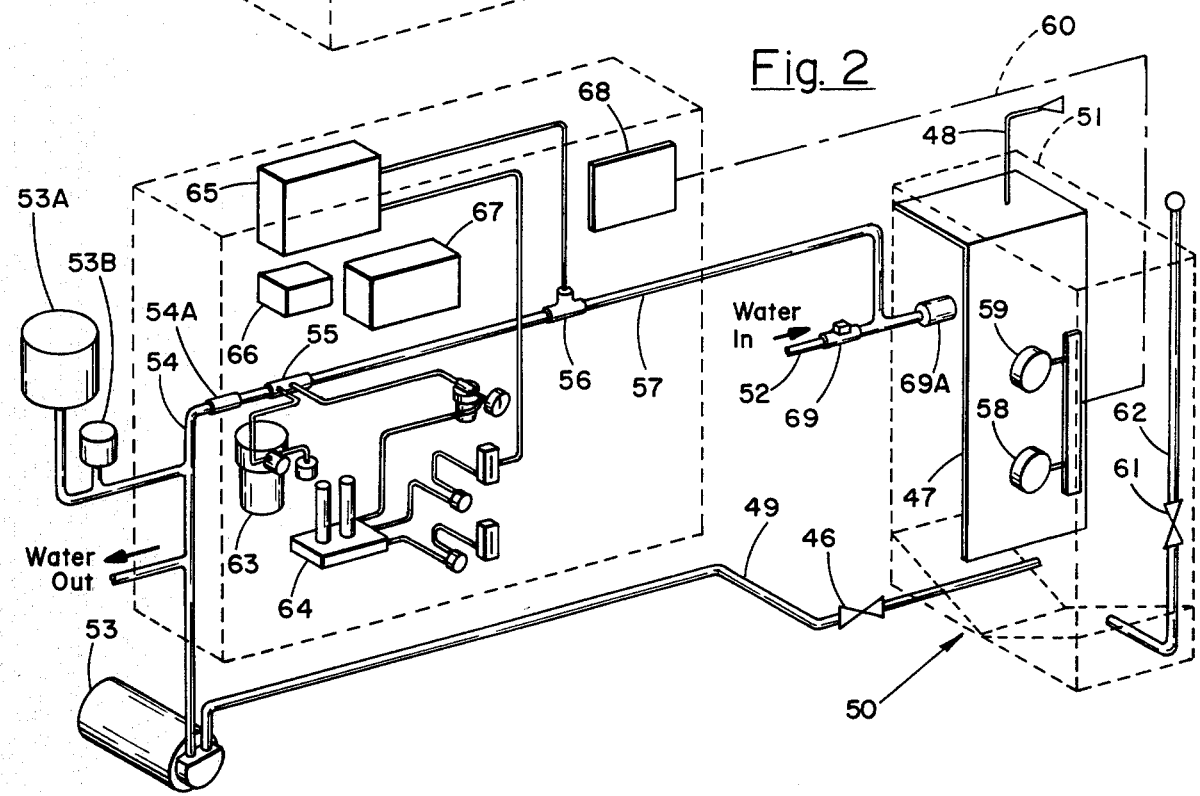
FIG. 2 is a schematic diagram of an alternate embodiment of the water purification system of the present invention, and illustrating certain features which are desirable in the system.

With respect to the system illustrated in FIG. 1, and is explicitly illustrated in FIG. 2, a vent is normally employed in the reaction and cycle tank 12 as is, of course, common in this type of system. Also, an electrical connection, not shown, is implicit between the control panel 36, and the tank 12. Such a control will maintain appropriate fluid levels within tank 12, and will be coupled in the manner illustrated in greater detail in FIG. 2. In this connection, floats such as are illustrated in the embodiment of FIG. 2 may be employed in combination with control 36.

A modified version of the system of FIG. 1 is illustrated in FIG. 2, with the system being generally designated 50, and including a reaction vessel as at 51 supplied with water through source 52, and being treated with ozone-enriched atmosphere through cycle pump 53 which draws the water from the reaction vessel 51 through line 49, which has a shut-off valve at 46, through the cycle pump 53 to line 54. The cycle pump 53 is stopped and started on demand by pressure switch 53B which, in turn, is operated by and responsive to the pressure in cylinder 53A. Line 54 passes the water through the chiller 55 and into the venturi injector 56 where the water is enriched with ozone. The ozone-enriched water then flows through line 57 and back into the reaction vessel. The reaction chamber or vessel 51 has a baffle 47 which is enclosed over the top and it is vented by line 48 to atmosphere outside the building. The opening to line 49 is disposed within the chamber on the side of the baffle opposite that side in which the water enters the vessel. Therefore, the water available for passage through line 49 will be subjected to a greater degree or level of exposure, thus assuring a greater degree of purity for the water entering line 49.

The water level in the reaction vessel is controlled by a set of float controls. Float 58 is the low-level control which is connected to the control panel by line 60. When a low level is indicated, the control panel automatically senses this condition and activates the solenoid valve 69 on line 52, allowing water to flow into the reaction vessel 51 to fill it. When float 59 is raised, indicating that the reaction vessel has reached its high level, the control 68 again senses the high level and closes the solenoid valve 69. Such level control systems are, of course, commercially available and are well known in the art.

The system 50 has an additional advantage in that it can further enrich the ozone in the water by recycling the water in the reaction vessel 51 upon a signal from the control 68 which has a built in timer. When desired, as indicated by the water quality, the control panel 68 will open the solenoid 54A, and recirculate the water internally as above indicated without demand being placed on the system's water output.

The embodiment of FIG. 2 shows a sludge drain line 62, having a suitable control valve 61. An inverted pyramid type sludge collecting vessel is arranged pendent to the reaction vessel to allow settlement and discharge of the sludge.

The ozone generation portion of system 50 is substantially identical to the ozone generation of FIG. 1 and need not be described further. The air required to produce ozone is supplied by the air compressor 63 which passes it through the chiller 55 which cools the air without refrigerant. The air then passes through the air drier 64 and is adequately dried. It then passes up to the electrode 65 where the air is converted into ozone by the action of the high frequency regulator 66 and the generator 67. Generator 67 produces an electrical charge in the electrode, converting the air to ozone. The air ladened with ozone is then passed from the electrode 65 to the venturi injector 56 and thusly into the water supply.

In the event the ozone-enriched atmosphere requires venting, a vent line from vessel 51 is shown as at 48, with an outlet to ambient 69. Since ozone, as a material, becomes toxic to humans when in a concentration in excess of about one part per million, venting to atmosphere is undesirable. In the present arrangement, however, injection into a venturi as indicated herein, under concentration conditions specified, the ozone concentration is dropped significantly, and reduced to essentially zero in the air or other atmosphere volume in the cycle tank 12.

Attention is now directed to FIG. 3 of the drawings wherein a typical ozone generator is illustrated schematically. The generator, generally designated 70, includes an outside housing as at 71 and a water-cooled inner cylindrical electrode as at 72. Electrical power is provided through source 73 along line 74 which is coupled to the outside housing 71. The inner cylindrical electrode is grounded to the system and to the source 73. Water for cooling is supplied through pump 76, supply line 77 and return line 78. In certain instances, when ground water is sufficiently cool, such as in the range of from 37° F. to 55° F., a heat transfer arrangement may be provided so as to maintain cooling water within the pump and conduit system 76, 77, and 78 at a desired lower level. The temperature desired within that system is generally at a temperature below 60° F. While temperatures as high as 105° F. may be tolerated, such temperatures tend to reduce the lifetime of ozone, and nascent monatomic oxygen may be created, thereby reducing the life of the ozone, and creating means for losing or reducing the ozone concentration to an ineffective level.

Attention is now directed to FIG. 4 of the drawings wherein specific details of an ozone generator are illustrated. The ozone generator, generally designated 80, includes an outer cylindrical shell, as at 81, which houses a tubular electrode 82. Tubular electrode 82 is provided with a cold water supply through gasketed inlet 83 and gasketed outlet 84. In this arrangement, chilling water is then free to pass through the system along the line and in the direction of arrow 85. The atmosphere being enriched enters the system through gasketed inlet 86, it being understood, of course, that such atmosphere includes air as well as oxygen and oxygen-enriched air. The atmosphere being treated then passes through the annular zone 87 which is defined between the outer surface of electrode 82 and the inner surface of shell 81, and ultimately passing outwardly through outlet port 89. A corona discharge is generated by the electrical supply source, as ilustrated at 73 in FIG. 3. For most applications, and for most efficient production of ozone-enriched atmosphere, the electrical energy supply should be at a frequency of at least 500 to 10,000 Hz. and at a potential of 3,000 to 10,000 volts. In this arrangement, the annuler zone 87 has a dimension of 1 to 2 millimeters. In other words, the extent of the gap between the outer surface of electrode 82 and the inner surface of shell electrode 81 is 1 to 2 millimeters.

In this system, ozone is generated in the ambient air passing through the system to a level of about 1% to 2%. However, up to 3% of ozone may be obtained by utilizing pure oxygen for the ambient air. Because of the toxic effects of ozone, such as concentrations greater than about one part per million, care should be taken to isolate the ozone-enriched air (or oxygen) from the environment. In order to achieve purification of water, and utilizing a 3% ozone mixture, approximately four cubic feet of such ozone-enriched air is injected continuously and uniformly into each volume of approximately 50 gallons of untreated water.

While the electrical parameters of the system described will generate an appropriate corona discharge, it has been found that frequencies of anywhere between 500 Hz. and 5,000 Hz. may be employed. Also, it will be appreciated that ozone generators are well-known in the art and are, of course, commercially available.

It will be appreciated that various modifications of the system of the present invention may be created, those skilled in the art will appreciate the utilization of such modifications.

I claim:

1. In a water purification system wherein water to be purified is contacted with ozone-enriched atmosphere, and including a source of water under pressure, supply conduit means, a chamber communicating with said source through said supply conduit means for receiving water under pressure, recirculation conduit means having both of its ends in fluid communication with said chamber, a source of ozone, and means for introducing ozone-enriched atmosphere into the water along said recirculation conduit means, said water purification system being characterized in that:

(a) said recirculation conduit means includes a venturi interposed therealong having an injection port for introducing ozoneenriched atmosphere from said ozone source into water passing along said conduit between said source and said chamber;

(b) said ozone source comprises a generally cylindrical shell forming a first electrode enclosing a second electrode in the form of a generally co-axially disposed tube, said shell and tube defining an annular corona generating zone between the inner surface of said shell and the outer surface of said tube, means defining an inlet and an outlet for passing ambient air into said zone, through said zone, and through said outlet to said injector port of said venturi and means defining a water inlet and a water outlet in fluid communication with said tube for allowing passage of a coolant through said tube;

(c) means for chilling and thereafter drying the ambient air prior to its being passed through said ozone generator; and (d) means for re-circulating water from said chamber through said conduit means and venturi for introducing the ozone-enriched atmosphere from said ozone source into water passing along said conduit on repeated passes from said chamber, and for return to said chamber/; and/.

2. The water purification system as defined in claim 1 being particularly characterized in that means are provided for periodically draining sludge from said water receiving chamber.

3. The water purification system as defined in claim 1 being particularly characterized in that said chamber includes baffle means for the division of said chamber into first and second compartments in mutual communication, one with another, and wherein water is introduced into the first of said compartments, and removed from the second of said compartments.

4. The water purification system of claim 1 wherein: said coolant in said tube is water.

5. The water purification system in claim 1 wherein: said means for chilling the ambient air prior to its being passed through said ozone generator includes a cooling means along said recirculation conduit and means forming in said cooling means a passage therethrough for water; said purification system further including an air conduit for directing ambient air through said cooling means and then to said ozone generator.

* * * * *